United States Patent [19]

Tunekawa et al.

[11] 4,000,498
[45] Dec. 28, 1976

[54] TEMPERATURE COMPENSATED EXPOSURE CONTROL APPARATUS FOR A CAMERA

[75] Inventors: Tokuichi Tunekawa, Yokohama; Takehiko Kiyohara, Zama; Masanori Uchidoi; Tetsuya Taguchi, both of Kanagawa; Yukio Mashimo; Yusuke Ono, both of Tokyo, all of Japan

[73] Assignee: Canon Kabushiki Kaisha, Tokyo, Japan

[22] Filed: Apr. 11, 1975

[21] Appl. No.: 567,116

[30] Foreign Application Priority Data

Apr. 18, 1974  Japan .............................. 49-43665
Mar. 17, 1975  Japan .............................. 50-31940

[52] U.S. Cl. .................................. 354/24; 354/51; 354/60 R
[51] Int. Cl.² ......................................... G03B 7/08
[58] Field of Search .............. 354/24, 50, 51, 60 R

[56] References Cited

UNITED STATES PATENTS

| | | | |
|---|---|---|---|
| 3,679,905 | 7/1972 | Watanabe | 354/50 X |
| 3,736,851 | 6/1973 | Ono et al. | 354/51 |
| 3,750,540 | 8/1973 | Yanagisawa et al. | 354/51 X |
| 3,777,638 | 12/1973 | Yata et al. | 354/24 |
| 3,820,126 | 6/1974 | Haratake | 354/24 |
| 3,852,774 | 12/1974 | Taguchi et al. | 354/24 |
| 3,863,263 | 1/1975 | Itagaki | 354/24 |

*Primary Examiner*—L. T. Hix
*Assistant Examiner*—J. A. LaBarre
*Attorney, Agent, or Firm*—Toren, McGeady and Stanger

[57] ABSTRACT

An exposure control apparatus which can set accurate shutter speed constantly irrespective of changes in ambient temperature and which can eliminate not only an error in shutter speed caused by an expansion semiconductor element but also an error in shutter speed caused by the variation in output characteristics due to variation in temperature of a compression circuit.

11 Claims, 3 Drawing Figures

TEMPERATURE COMPENSATED EXPOSURE CONTROL APPARATUS FOR A CAMERA

BACKGROUND OF THE INVENTION

1. Field of the Invention

The present invention relates to an exposure control apparatus for camera, and more particularly relates to an exposure control apparatus having a temperature compensation device for camera.

2. Description of the Prior Art

As is known well, since a photo-electric conversion element for sensing object bright is positioned at a finder optical system, etc. in a single lens reflex camera, incident light into said element is shielded by the mirror up, etc., while shutter is in operation. Therefore, for obtaining appropriate exposure value by controlling an electric shutter circuit from the output of the photo-electric conversion element, it is necessary to memorize the measured value of object brightness before the shutter is activated by some means for example a memory capacitor. Such a memory type electric shutter is publicly known. In such an electric shutter, when object brightness varies over a wide range, memory function with such wide range of level as following said variation is required for a memory capacitor. Furthermore, a timer circuit which is to detect the terminal voltage of said memory capacitor for adjusting the limit time of a shutter must employ a circuit which corresponds linearly to said terminal voltage with wide range. However, since such a circuit and capacitor which satisfies said requirements are expensive and have a complicated circuit arrangement, heretofore a light measuring circuit having a log. diode with logarithmic compression characteristics connected to the above mentioned photo-electric conversion element is employed Timer action is made based on the compressed photo-electric conversion element output signal, thus eliminating the above mentioned shortcomings of conventional devices.

However, in a device of such type to compress such photo-electric conversion element output, when the timer action is completed, the memorized photo-electric conversion element output is expanded once using an expansion diode, etc. As this expansion diode has large dependence on temperature, accurate shutter speed control cannot be performed constantly in a conventional device.

SUMMARY OF THE INVENTION

An object of the present invention is to provide an exposure control apparatus which eliminates shortcomings of said conventional devices.

Another object of the present invention is to provide an exposure control apparatus which can set accurate shutter speed constantly irrespective of changes in ambient temperature.

Further, another object of the present invention is to provide an exposure control apparatus which can eliminate not only the error in shutter speed derived the expansion semi-conductor element but the error in shutter speed derived from the variation in output characteristics by the variation in temperature of the compression circuit.

Other objects of the present invention will be made clear from the detailed explanations of the present invention given in reference to drawings.

DESCRIPTION OF THE EMBODIMENTS OF THE INVENTION

Now an example of the present invention will be explained referring to drawings.

Figure 1:
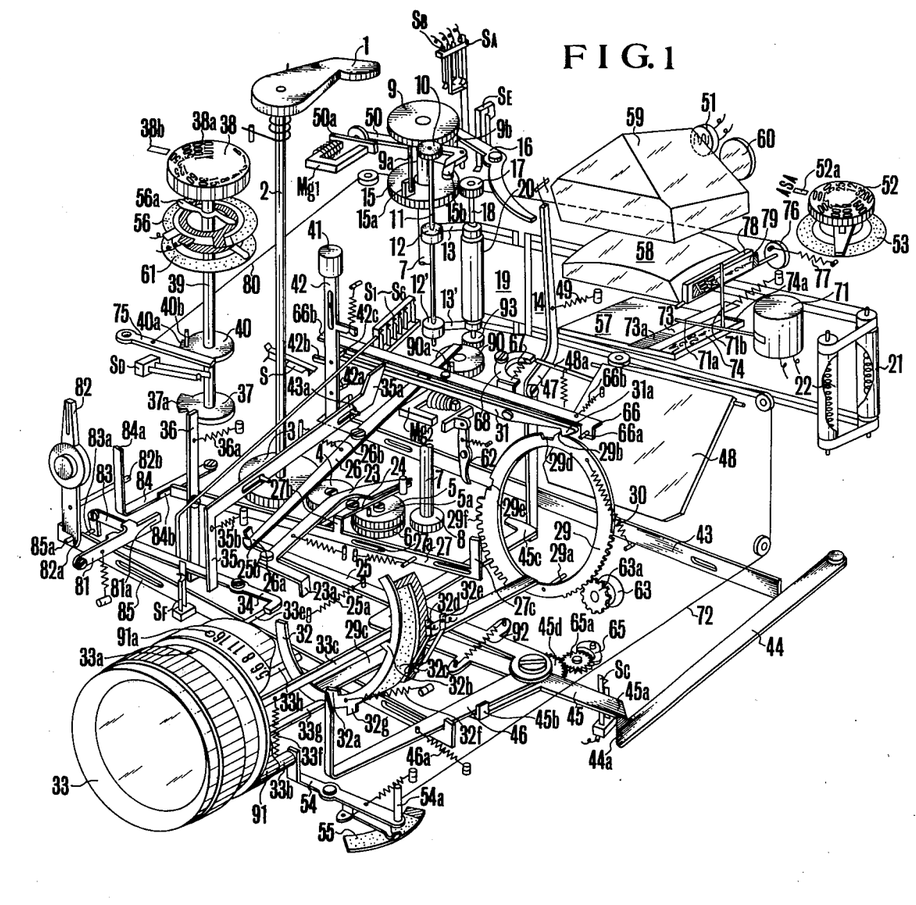
FIG. 1 is a set-up drawing of an automatic exposure control apparatus of a camera showing an example of the present invention.

FIG. 1 shows structure of a camera as wind up is completed, wherein 1 is a wind up lever and gear 3 is provided at forward end of a wind up axle 2 of said wind up lever 1. Said gear 3 engages with a gear 5 through a gear 4. And a sector gear 6 is integrally assembled to said gear 5 coaxially, and said sector gear 6 is engageable with a gear 8 fixed at the lower end of a shutter wind up axle 7. Also, a master gear 9 is assembled to the upper end of the shutter wind up axle 7 and said master gear 9 engages with a pinion gear 10. Said pinion gear 10 has take up drums 12, 12' attached thereto coaxially 11. Said take up drums 12, 12' can take up a front screen 14 through front screen ribbons 13, 13'. 21 is a front screen pull spring. The above mentioned master gear 9 has pins $9a$, $9b$ planted thereon, and the pin $9a$ is engageable with a pin $15a$ of a master gear 15 which is inserted through the axle 7 in a rotatable manner, while the pin $9b$ is engageable with one end of a hook lever 16 which is rotatable. And said master gear 15 engages with a pinion gear 17, and said pinion gear 17 has a take up drum 20 for rear screen 19 coaxially attached thereto.

22 is a rear screen pull spring. And a stop claw $15b$ is provided at the master gear 15 and said stop claw $15b$ is checked by one end of a rotatable lever 50 thereby preventing the rotation of the master gear 15. An attracting piece $50a$ which is attracted by an electro-magnet $Mg_1$ is provided at the other end of said lever 50. And when said attracting piece $50a$ is attracted to the electro-magnet $Mg_1$, one end of the lever 50 checks the stop claw $15b$. SE is a switch and is made ON, OFF depending on the rotation state of the above mentioned hook lever 16. And the hook lever 16 makes a switch SA ON by its rotation state to control a switch SB by change over. Pin $5a$ is planted on the above mentioned gear 5 and said pin $5a$ rotates levers 23, 24 in counterclockwise direction together with itself as it rotates to counterclockwise direction. 25 is a lever which is rotatingly biased to counterclockwise direction by a spring $25a$, one end of which is axially supported. When the above mentioned lever 23 is rotated in counterclockwise direction, said lever 25 is pushed by an end part $23a$ of the lever 23, thereby the bent part $25b$ at the other end of the lever 25 engages with the hook part $26a$ of a lever 26. This lever 26 is rotatingly biased in clockwise direction by spring $26b$ and the other end thereof is positioned on a gear 90. This gear 90 engages with a gear 93 attached to an axle 18 of the above mentioned pinion gear 17. A pin $90a$ is planted on said gear 90, and as the gear 90 rotates in clockwise direction, the above mentioned lever 26 is rotated by the pin $90a$ to counterclockwise direction.

27 is a lever biased to left direction by a spring 27a and a riser part 27b is formed at an almost central part of said lever 27, and said riser part 27a engages with the forward end of the above mentioned lever 24. Therefore, the lever 27 is shifted to right direction by the counterclocksise directional rotation of the lever 24. Also one end of the lever 27 forms a bent part 27c. 29 is a saw-tooth ring rotatingly biased to clockwise direction by a spring 30, and a pin 29a is planted on said saw tooth ring 29, and said pin 29a is pushed by the bent part 27c when the above mentioned lever 27 is shifted to right direction, so that the tooth ring 29 is rotated in counterclockwise direction. And a claw part 29b is formed at said saw tooth ring 29, and said claw part 29b is to engage with the hooked part 31a of a check lever 31 by the rotation of the saw tooth ring 29 in clockwise direction. 32 is a resistance ring rotatingly biased in counter-clockwise direction by a spring 32f, and the riser part 29c formed at the saw tooth ring 29 engages with a protruding piece 32a and said resistance ring 32, wherein the resistance ring 32 rotates to counterclockwise direction by the rotation of the saw tooth ring 29 to counterclockwise direction. 32c is a variable resistance provided on the ring 32, and 32d, 32e are contacting pieces of the variable resistance 32c. 33 is a lens barrel which is exchangeable, and diaphragm digits and EE mark 91a for matching with a fixed mark 33a on the lens barrel 33 are punched on a diaphragm aperture setting ring 91 of the lens barrel 33. Various signal pins and signal levers are protruding out of the rear part of said lens barrel 33. That is, 33c is a diaphragm signal lever to engage with a protruding part 32b of the resistance ring 32, and this lever 33c has its position changed in an association with stop down of diaphragm setting ring 91.

33b is a fully opened FNo signal pin, and said signal pin 33b is to transmit the fully opened FNo possesed by exchange lens to body side, and its protruding amount is determined depending on the fully opened FNo of the lens.

33g is a stop down pin and is to stop down the diaphragm within lens barrel to such diaphragm aperture value as corresponding to the position of the above mentioned diaphragm signal lever 33c as the automatic stop down lever 46 rotates.

33e is an EE change over pin, and this EE change over pin 33e protrudes as the diaphragm setting ring 91 is rotated to match the EE mark 91a with the fixed mark 33a, and various change over actions are made by rotating lever 34 at body side associated with protruding of said pin 33e. 33h is a diaphragm step number pin and said diaphragm step number pin 33h transmits the number of diaphragm steps used by the exchange lens to the body side by checking the protruding part 32g of the resistance ring 32.

The light penetrating through photographing lens of lens barrel 33 proceeds through a reflective mirror 48, a focal plate 57, a condensor lens 58, a pentagonal prism 59 in said order and is led to an eye-piece 60, while a portion of the light penetrating through the pentagonal prism 59 will be incident into a light receiving element 51. 41 is a release button and 42 is a release bar. Pins 42a, 42b, 42c are provided at said release bar 42, wherein the pin 42b is to make a power souce switch S ON, and the pin 42c is to push one end of said lever 31 to rotate the lever 31 to counterclockwise direction for releasing engagement between the hook part 31a and the saw tooth ring 29. Also the pin 42a is to engage with one end slanted part 43a of the lever 43 to shift the lever 43. 44 is a lever one end of which is axially supported, and this lever 44 engages with one end 45a of a lever 45, and is rotated to counterclockwise direction by the shifting of said lever 43 for having its engagement with one end 45a of the lever 45. And the lever 45 is axially supported coaxially with an automatic stop down lever 46 which is engaged with the above mentioned lever 25 and the above mentioned stop down pin 33g. And a riser part 45b engaged with the automatic stop down lever 46 is provided at said lever 45 and a spring 92 is spanned between said lever and the above mentioned lever 25. And the forward end part 45c of the lever 45 is in contact with one end of a mirror push-up lever 47 which is biased by a spring 49 to clockwise direction. By this the lever 45 will be rotated by the spring 92 to clockwise direction as its engagement with the lever 44 is released to rotate the automatic stop down lever 46 and to rotate the mirror push-up lever 47 to clockwise direction. Also the rotation of the lever 45 is to make the switch Sc OFF. The above mentioned mirror push-up lever 47 has a pin 48a of the mirror 48 engaged with its central bent part while the other end of the same engages with the other end of the above mentioned lever 16. Because of this, the mirror 48 is pushed up through the pin 48a by the rotation of the mirror push-up lever 47 to clockwise direction, and at the same time the hook lever 16 is rotated to clockwise direction. 62 is a saw tooth block lever which is rotated by attraction of an electro-magnet Mg₂, and engages with any one of the saw teeth 29f of the saw tooth ring 29.

66 is a sensor lever rotatingly biased by a spring 66b to counterclockwise direction, and this sensor lever 66 has a pin 66a provided thereon for engagement with notched part 29d or 29e of the saw tooth ring 29, and as the pin 66a is engaged the sensor lever 66 is to change over the switches S₁ to S₅. This sensor lever 66 is rotated to clockwise direction by pressing link members 67, 68 which function in an association with the rotation of the mirror push-up mirror 47. 63 is an escapement which is to make the rotation of the saw tooth ring 29 uniform by engagement of its escape tooth 63a with the saw tooth ring 29. 65 is an escapement, which is to delay the rotation of the lever 45 for a certain period of time by engagement of its escape tooth 65a with engagement part 45d of the lever 45. Therefore, the lever 45 is to make rotation always in delayed manner by the rotation of the saw tooth ring 29. 52 is a film sensitivity setting dial and the variable resistance 53 is to have such resistance value as corresponding to the matching of the letters punched on said dial with the mark 52a. 38 is a shutter dial, which has an AUTO mark 38a and letters to show shutter time punched thereon. 38b is a fixed mark to set shutter time. As any given shutter time is matched with said fixed mark 38b, the position of contacting piece 56a attached to a shutter dial axle 39 varies, and the resistance value of shutter time setting variable resistance 56 is set in association with said positional variation to such value as corresponding to any given shutter time. 61 is a variable resistance for shutter time input information and this resistance 61 is also set at such value as corresponding to desired shutter time. Also a disk 40 is attached to axle 39 of the shutter dial 38, and bulged part 40a of said disk 40 can make the switch SD ON and OFF, wherein as the shutter dial 38 is set at the AUTO mark 38a the switch SD becomes ON, and as the dial is set at desired shutter time it becomes OFF. Also a disk 37a is provided at the axle 39 and a bulged part 37a is provided at said disk 37. As the shutter dial 38 is set at AUTO, said bulged part 37a restricts the rotation of the lever 36, and as the shutter is set at desired shutter time the rotation of the lever 36 is freed. This lever 36 is rotatingly biased to clockwise direction by a spring 36a and is checked by the lever 34 which is linked with protruding action of the above mentioned EE change over pin 33e. Therefore, as the EE change over pin 33e protrudes when the preset ring 91 is set at EE, the lever 36 is rotated to clockwise direction by the rotation of the lever 34 to counter-clockwise direction.

By this even if a trial is made to set the shutter dial 38 to AUTO, setting becomes impossible being restricted by the lever 36. Also the switches $S_1$ to $S_5$ are changed over by the rotation of the lever 36. Said lever 34 changes over the switch SF by the rotation of the lever 34, and shifts the lever 35, which is biased by spring 35b, to right direction. A cam part 35a of said lever 35 rotates lever 31 to counterclockwise direction by right hand shifting of said lever 35. 71 is a meter, and a pointer 71a of said meter 71 is positioned on a diaphragm aperture value indication plane 74 provided on a focal plate 57, to indicate appropriate diaphragm aperture value at that time. Also fully opened FNo indication plate 73 is provided on the focal plate 57, and said indication plate 73 is to indicate the fully opened FNo of exchange lens used, and indicates that exposure setting condition of camera is improper against an object at that time when the pointer 71a points limit marks 73a or 74a. And the amount of protrusion of the fully opened FNo signal pin 33b is transmitted from a pin 54a planted on lever 54 which rotates according to the amount of protrusion of said signal pin 33b through string 72 to the above mentioned indication plate 73. 55 is a variable resistance as fully opened FNo information, and the resistance value of said variable resistance of said variable resistance 55 is determined according to the amount of rotation of the lever 54. A shutter time indication plate 79 is positioned at side end plane of condensor lens 58 through mirror 78. And a pulley 76 fixing mirror 78 is linked with a lever 75 which is rotated by a pin 40b planted on the above mentioned disk 40 through string 80. As the lever 75 is rotated, said rotation is transmitted to the mirror 78 through string 80 and pulley 76, and the mirror 78 proceeds with an angle of 45° into finder field of vision to cover the diaphragm aperture value indication plane 74 and at the same time the shutter time indication plate 79 and image of pointer 71b being branched from pointer 71a appear within finder field of vision being reflected by the mirror 78. Also, as the EE change over pin 33e withdraws itself the lever 34 rotates in an association with said action and the above mentioned lever 34 engages with notched part 81a of a safety lever 81. 83 is a crank lever to release engagement between the safety lever 81 and the lever 34, and this crank lever 83 releases engagement between the safety lever 81 and the lever 34 as a planted pin 83a is pushed up by the rotation of the lever 82 to counterclockwise direction.

Also a pin 82b is planted on the lever 82, and the pin 82b pushes riser part 84a of the lever 84 by the rotation of the lever 82 to shift the lever 27 to right direction. Also 85 is a slide lever engaged with the above mentioned automatic stop down lever 46, and this slide lever 85 is shifted to left direction by the rotation of said lever 82 to clockwise direction to rotate the automatic stop down lever 46.

Figure 2:
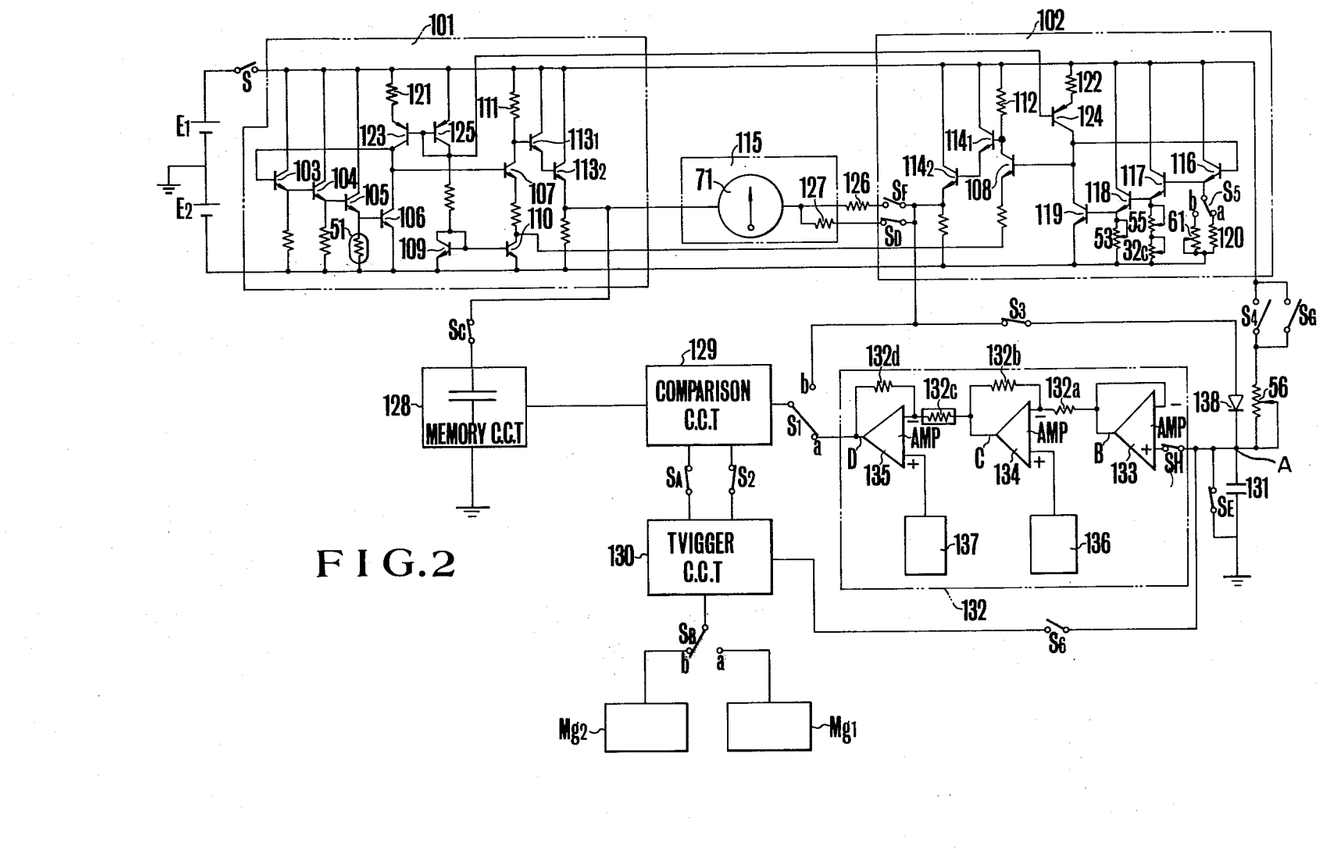
FIG. 2 is an exposure control circuit diagram of a camera shown in FIG. 1.

FIG. 2 shows exposure control circuit of a camera shown in FIG. 1. S, $S_1$ to $S_5$, SA to SF in said drawing are to show switches shown in FIG. 1, while 32c, 53, 55, 56, 61 indicate resistances shown in FIG. 1. 51 and 71 show a light receiving element and a meter, respectively, while $Mg_1$, $Mg_2$ show electro-magnets. In said drawing, $E_1$ and $E_2$ are power sources, and S is a power source switch. 101 is an object brightness information circuit, and 102 is a photographing information circuit at which exposure information other than brightness information is set. These circuits 101, 102 have following set-up. 103 to 106 are transistors constituting a direct coupling type amplification circuit, and a light receiving element 51 is connected to emitter resistance of the transistor 105. 107 and 108 are transistors constituting a differential amplification circuit, and 109 and 110 are transistors consitituting a constant current circuit of differential amplification circuit. 111 and 112 are load resistances. And an amplification circuit, consisting of transistors $113_1$, $113_2$, $114_1$, $114_2$ being constituted in directly coupled 2 steps of emitter-follower, is connected to the collector side of the transistors 107, 108, and meter 71 as an indication circuit 115 is connected to emitters of the transistors $113_2$ and $114_2$. And 116 to 119 are transistors consituting a direct coupling type amplification circuit, and variable resistance 61 and bias resistance 120 at the time of diaphragm preference are connected as shutter time input information through switch $S_5$ in parallel with the emitter of the transistor 116, and the variable resistance 55 as fully opened FNo information and the variable resistance 32c as diaphragm information are connected in series to the emitter of the transistor 117, and the variable resistance 53 as ASA information is connected to the emitter of the transistor 118. The output load resistance of the above mentioned transistors 106, 119 are made as a series circuit of resistances 121, 122, transistors 123, 124, are connected to transistor 125 being diode connected jointly. A series circuit of diaphragm indication resistance 126, switch SF and a series circuit of shutter indication resistance 127, switch SD are connected in parallel between meter 71 and emitter of transistor $114_2$. 128 is a memory circuit to have output of object brightness information circuit 101 as input thereinto to memorize and retain inputted brightness information by making switch Sc OFF. 129 is a comparison circuit to compare the output of memory circuit 128 and the output of photographing circuit 102 and outputs matching signal when they are matched. 130 is a trigger circuit to drive electro-magnets $Mg_1$ and $Mg_2$ with output of the comparison circuit 129 through switches SA and $S_2$. SB is a change over switch to add output of the trigger circuit 130 to the electro-magnets $Mg_1$ and $Mg_2$. 56 and 131 are shutter time setting variable resistance and capacitor constituting a time constant circuit for shutter time. The terminal voltage of said capacitor 131 is added to the above mentioned trigger circuit 130. Output terminal of the photographing information circuit 102 is connected through diode to said capacitor 131. SE is a count switch being connected in parallel with the capacitor 131. $S_4$ is a switch to place the time constant circuit in operative state, and an always opened switch SG for manual use is connected in parallel therewith. 132 is a temperature compensation circuit, and terminal voltage of the capacitor 131 is added to said circuit 132 at the time of diaphragm preference through an always closed switch SH, and the output of photographing information circuit 102 is added to said capacitor 131 through switch $S_3$ and diode 138. Said temperature compensation circuit 132 is formed by an impedance conversion amplifier 133 consisting of an operational amplifier, an operational amplifier 134 having a resistance 132b connected between input and output terminals, an operational amplifier 135 having resistance 132d connected between input and output terminals, a resistance 132a, a temperature compensation resistance 132c consisting of coil resistance thermister, etc., a power source 136 with its output voltage varied depending on temperature variation, and a constant voltage power source 137. $S_1$ is a change over switch which connects comparison circuit 129 selectively to photographing information circuit 102 and temperature compensation circuit 132.

Next, the function of above mentioned set-up will be explained. As a wind up lever 1 is wound up to counterclockwise direction, the gear 3 rotates to counterclockwise direction though shaft 2. The rotation of said gear 3 transmitted to the gear 5 through the gear 4 to have the gear 5 make one rotation to counterclockwise direction. As the sector gear 6 integral with the gear 5 is rotated by this, the gear 8 is rotated to rotate the master gear to clockwise direction. By this the pinion gear 10 is rotated to counterclockwise direction, therefore, the front screen 14 is shifted to left direction against the front screen pull spring 21 by the take up drums 12, 12' and the front screen ribbons 13, 13', and is set at a prescribed position by the engagement between the pin 9b and the hook lever 16. Also, the rotation of the master gear 9 is transmitted to the master gear 15 by engagement of the pin 9a with the pin 15a. By this the pinion gear 17 rotates to counterclockwise direction, therefore the rear screen 19 is wound up to left direction against the rear screen spring 22 and is set at a prescribed position.

On the other hand, by the rotation of the gear 5, the pin 5a engages with the levers 23, 24 to rotate said levers to counterclockwise direction. By this, the end part 23a of the lever 23 pushes the lever 25 against the spring 25a, the lever 25 rotates to clockwise direction and the bent part 25b engages with the hooked part 26a of the lever 26. Also as the lever 24 pushes the riser part 27b of the slide lever 27, the slide lever 27 is shifted to right direction against the spring 27a, and the bent part 27c pushes the pin 29a of the saw tooth ring 29.

By this saw tooth ring 29 rotates to counterclockwise direction against spring 30, and at the time when this rotation is completed, the claw part 29b engages with the hooked part 31a of the check lever 31 and the rotation of the ring 29 by spring 30 to clockwise direction is stopped. This rotation of the saw tooth ring 29 is transmitted to the resistance ring 32 through its riser part 29c, and the resistance ring 32 is rotated according to the rotation of the saw tooth ring 29.

Here, explanations will be made on a case when automatic control system of shutter with diaphragm preference is made, wherein the camera is in a state being wound up as mentioned above.

First as the diaphragm setting ring 91 is manually rotated to have desired diaphram aperture value to the mark 33a, the diaphragm signal lever 33c is shifted to the position of desired diaphragm aperture value. By this, the resistance ring 32 is rotated to the shifted position of the diaphragm signal lever 33c by the biasing power of spring 32f thus resistance value of the variable resistance 32c is determined. Also by the rotation of the diaphragm setting ring 91, EE change over pin 33e retracts itself, thereby the lever 34 rotates to clockwise direction to make switches SF OFF. By this the lever 35 is shifted to right direction by compressive power of the spring 35b. By this, the cam part 35a of the lever 35 pushes one end of the check lever 31 to rotate the lever 31 to counterclockwise direction, therefore the engagement between the hooked part 31a of the lever 31 and the claw part 29b of the resistance ring 29 is released, and the saw tooth ring 29 rotates to clockwise direction by the spring 30.

By the clockwise directional rotation of the above mentioned lever 34 the lever 36 rotates to counterclockwise direction to make the rotation of the disk 37 possible and change over the switches $S_1$ to $S_6$. That is, movable contacting pieces of switches $S_1$ and $S_5$ are changed over the fixed contact a side to make the switches $S_2$ and $S_3$ ON and the switches $S_4$ and $S_6$ OFF. And as the shutter dial 38 is rotated and AUTO mark 38a is matched with the mark 38b, disk 40 rotates to make the switch SD ON and at the same time the lever 75 is rotated to clockwise direction. By this, the rotation of the lever 75 is transmitted to the pulley 76 through string 80, and the mirror 78 proceeds into finder field of vision with about and angle of 45°. By this the diaphragm aperture value indication plate 74 disappears instead shutter time indication plate 79 and the image of pointer 71b of the meter 71 are reflected by the mirror 78 and appears within finder field of vision. On the other hand, as the disk 37 is fixed at the axle 39, the bulged part 37a comes to be positioned in front of the lever 36 and the rotation of the lever 36 is restricted. By this, it becomes impossible to conduct matching operation of EE mark 34a and mark 33a by rotating diaphragm setting ring 91.

As the release button 41 is pressed under this state, the release bar 42 descends to shift the lever 43 to right and to place the power source switch S ON. By this, at the object brightness information circuit 101, the resistance value of the light receiving element 51 will take a certain level by the light from an object, and such output as corresponding to the amount of incident light into the light receiving element 51 will be generated at the output of the transistor 106 of direct-coupled type amplification circuit. Since there is a feedback path between the collector of transistor 106 and the base of transistor 103 in said amplification circuit, the variation in resistance value corresponding to the amount of incident light into the light receiving element 51 will be compressed and generated at the output thereof. Also, in the photographing information circuit 102, ASA information, fully opened FNO information, diaphragm information are set at the variable resistances 53, 55, 32c in the circuit of transistors 116 to 119 constituting direct-coupled type amplification circuit, and there is a feedback path also in this amplification circuit from the collector of transistor 119 to the base of transistor 116, therefore the variation in the values of information set at the variable resistances 53, 55, 32c is compressed and appears at the output of the amplification circuit. The outputs of these two direct-coupled type amplification circuits are synthesized by transistors 107, 108 constituting a differential amplification circuit and are given to the meter 71 through transistors $113_1$, $113_2$, $114_1$, $114_2$ of two step amplification type being connected to the collectors of said transistors 107, 108. Because of this, the pointer 71b of the meter 71 points the appropriate shutter time at that time on the shutter time indication plate 79 and it is indicated within finder field of vision. Also the lever 44 is rotated to counterclockwise direction by shifting of the lever 43 to right direction and the engagement between the hooked part 44a and the forward end part 45a of lever 45 is released, therefore the lever 45 is rotated to clockwise direction by spring 92. Because of this, the memory switch Sc becomes OFF and the output of the above mentioned object brightness information circuit 101 is memorized and retained by the memory circuit 128, and at the same time the riser part 45b of lever 45 engages with the automatic stop down lever 46 to rotate said lever 46 to clockwise direction.

As the stop down pin 33g is driven by said rotation of the automatic stop down lever 46, the diaphragm within the lens barrel 33 is stopped down to the diaphragm aperture value set by the above mentioned diaphragm setting ring 91. On the other hand, as one end 45c of lever 45 pushes the mirror push-up lever 47, said lever 47 rotates to counterclockwise direction to have the mirror 48 ascend. As the forward end of lever 47 pushes end part of the hook lever 16 after the mirror 48 ascends, the lever 16 is rotated to clockwise direction. By this, the engagement between the lever 16 and the master gear 9 is released, therefore, the front screen 14 runs by the front screen pull spring 21. Also, the count switch SE and switch SA are made OFF by the rotation of the lever 16 to clockwise direction, and at the same time, the movable contacting piece of switch SB is changed over to the fixed contact a side, magnetizing the electro-magnet $Mg_1$ to retain the rear screen 19. Thus the output of photographing information circuit 102 is charged at the capacitor 131. The terminal voltage of this capacitor 131 is added to the comparison circuit 129 through temperature compensation circuit 132. In this case the terminal voltage $V_c$ of the capacitor 131 after t hours since starting said charging will be as expressed by the following equation:

$$Vc = E - \frac{KT}{q} (\ln \frac{CK}{q^t} - \ln Is (T) + \ln T) \qquad (1)$$

Figure 3:
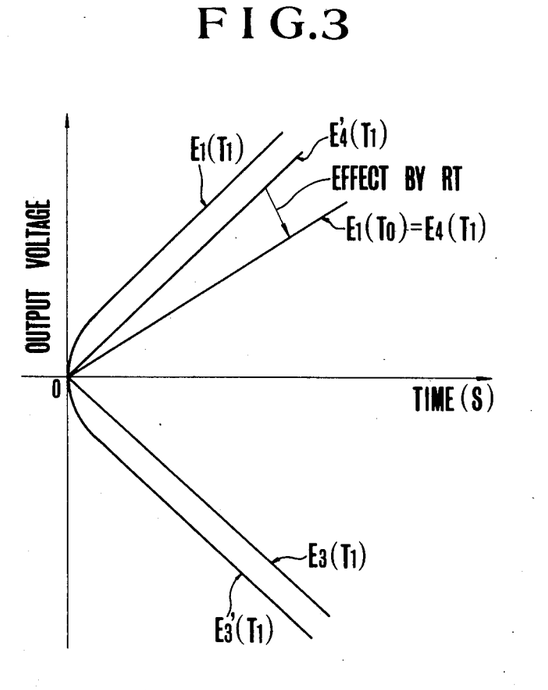
FIG. 3 is a functional schematic drawing of a temperature compensation diagram forming a part of the apparatus of the present invention.

In the equation:
$E$ : emitter potential of transistor $114_2$
$K$ : Voltsman constant
$T$ : absolute temperature
$q$ : charge volume of electron
$C$ : static capacity of capacitor 131
$t$ : time While the potential at point A of capacitor 131 will vary as shown by $E_1(To)$ in FIG. 3, following the formula (1) at a certain temperature To, it varies as shown by $E_1(T_1)$ at the temperature of $T_1$. On the other hand, when voltage varying as shown by $E_1(T_1)$ in FIG. 3 is given to the negative input terminal of the operational amplifier 134, the polarity of said input is inversed and tries to become such voltage as shown by $E'_3(T_1)$ in FIG. 3, but since constant voltage source 136 with such output voltage as varying against temperature is connected to the positive input terminal of said amplifier 134, it becomes such output voltage as shown by $E_3(T_1)$ in FIG. 3. Since this output voltage of amplifier 134 is given to the negative input terminal of the operational amplifier, it is inversed again and becomes to have such output characteristics as $E'_4(T_1)$, and said output characteristics is compensated by the resistance 132c and becomes $E_4(T_1)$. Thus the output characteristics of the amplifier 135 will be equivalent to the output characteristics $E_1$ (To) of charging circuit at temperature To even if the temperature is changed to $T_1$. When the terminal voltage of capacitor 131 of charging circuit coincides with the memorized voltage of the memory circuit 128, the comparison circuit 129 gives coincidence signal to trigger circuit 130, therefore, the electro-magnet $Mg_1$ is placed in non-magnetized state. By this, the electromagnet $Mg_1$ releases attraction of the attracting piece 50a of lever 50, therefore the rear screen 19 runs by the rear screen pull spring 22. By this running of the rear screen 19 the gear 90 rotates to rotate the lever 26 to counterclockwise direction. Because of this, the engagement between the hooked part 26a of lever 26 and the bent part 25b of the lever 25 is released, therefore, the lever 25 rotates to counterclockwise direction by spring 25a. Since the lever 45 also rotates integrally at this time, the mirror push-up lever 47 rotates to clockwise direction by spring 49 to have the mirror 48 descend and return to its original position. Also since the automatic stop down lever 46 engaging with the forward end 45a of lever 45 also rotates to counterclockwise direction by spring 46a, the stop down pin 33g also returns and the diaphragm is placed in fully opened state.

Next, explanations will be made on a case when automatic diaphragm aperture control system of shutter time preference is made, wherein a camera is in a state being wound up as mentioned above.

As the shutter dial 38 is rotated to match a desired shutter time to the mark 38, the resistance value of the variable resistances 56, 61 are set at such values as corresponding to desired shutter time, and the disk 40 rotates to place switch SD in OFF state. At this time, since the pin 40b of the disk 40 will not rotate the lever 75, the image of shutter time indication plate 79 will not appear within finder field of vision, instead the diaphragm aperture value indication plate 74 appears within finder field of vision. Also as the disk 37 rotates, its bulged part 37a escapes from the front plane of the lever 36, thus the rotation of lever 36 is freed. And when the diaphragm setting ring 91 is rotated to match EE mark 91a with the mark 33a, the EE change over pin 33e protrudes to rotate the lever 34 to counterclockwise direction.

Because of this, as the lever 35 is shifted to left direction against spring 35b, it is placed in such state as being separated from the check lever 31. At the same time, as the lever 36 rotates to clockwise direction, even if trial is made to set shutter dial 38 to AUTO, the bulged part 37a of disk 37 is checked by the lever 36, therefore setting of AUTO becomes impossible. Also as the lever 34 rotates to counterclockwise direction, the switch SF is made ON and as the lever rotates to clockwise direction switches $S_1$ to $S_6$ are charged over. That is, the movable contacting pieces of switches $S_1$ and $S_5$ are changed over to the fixed contact b side, making the switches $S_2$ and $S_3$ OFF, while making the switches $S_4$ and $S_6$ ON. As the release button 41 is pressed under this state, the release bar 42 descends to rotate the check lever 31 to counterclockwise direction and the power switch S is made ON. Because of this, at the object brightness information circuit 101, the resistance value of light receiving element 51 takes a certain value by the light from an object, and such output as corresponding to the amount of incident light into the light receiving element 51 will be generated at the output of transistor 106 of direct-coupled type amplification circuit. Since there is a feedback path between the collector of transistor 106 and the base of transistor 103 of this amplification circuit, the resistance value variation correspondingg to the amount of incident light to the light receiving element 51 is compressed and generated at the output terminal. Also at the photographing information circuit 102, ASA information, fully-opened FNo information, shutter time information are set at the variable resistances 53, 55, 61 in the circuit of transistors 116 to 119 constituting a direct-coupled amplification circuit, and since there is a feedback path at said amplification circuit from the collector of transistor 119 to the base of transistor 116, the variation of the values of information set at the variable resistances 53, 55, 61 is compressed and appears at the output of the amplification circuit. The outputs of these two direct-coupled amplification circuit are synthesized by transistors 107, 108 constituting a differential amplification circuit, an is added to the meter 71 through transistors $113_1$, $113_2$, $114_1$, $114_2$ of two step amplification type being connected to the collector thereof. On the other hand, as the check lever 31 rotates to counterclockwise direction, the engagement between the hooked part 31a and the claw part 29b of saw tooth ring 29 is released, and the saw tooth ring 29 rotates to clockwise direction by spring 30. Because of this, the restriction of the protruding piece 32a of resistance ring 32 by the riser part 29c is released and the resistance ring 32 rotates by a spring 33f which biases the diaphragm signal lever 33c to clockwise direction with constant speed by the escapement 63. Because of this, the variable resistance 32c varies to such resistance value as corresponding to the amount of rotation of the resistance ring 32. Therefore, when the output of photographing information circuit 102 matches with the output of object brightness information circuit, the comparison circuit 129 gives coincidence signal to the trigger circuit 130, therefore, electro-magnet $Mg_2$ is placed in magnetized state, and the electro-magnet $Mg_2$ attracts the saw tooth block lever 62 to stop the rotation of the saw tooth ring 29. Because of this, the rotation of the resistance ring 32 is stopped thus determining the resistance value of the variable resistance 32c, and at the same time the position of diaphragm signal lever 33c is also determined, thus such appropriate diaphragm aperture as corresponding to object brightness at that time is determined. Also, the pointer 71a of the meter 71 indicates appropriate diaphragm aperture value at that time on the diaphragm aperture value indication plane 74, and said indicated value is shown within the finder field of vision. As the release button 41 is further pressed the lever 43 is shifted to right direction. By this shifting of the lever 43 to right direction the lever 44 rotates to counterclockwise direction and the engagement between the hooked part 44a and one end 45a of the lever 45 is released, therefore, the lever 45 rotates to clockwise direction by the spring 92. As said rotation of lever 45 is delayed for a certain period of time by the escapement 65 and the escapement tooth 64, the action of the lever 45 is made always with a delay from the operational cycle of the saw tooth ring 29.

By this action of lever 45, the memory switch Sc becomes OFF to memorize and retain the output of the above mentioned object brightness information circuit 101 at the memory circuit 128, and at the same time the riser part 45b of lever 45 engages with the automatic stop down lever 46 to rotate said lever 46 to clockwise direction. As the stop down pin 33g is driven by said rotation of automatic stop down lever 46 the diaphragm within lens barrel 33 is stopped down to the diaphragm aperture value determined by the position of the above mentioned diaphragm signal lever 33c. On the other hand, as the forward end 45c of lever 45 pushes the mirror push-up lever 47, said lever 47 is rotated to counterclockwise direction to push the mirror 48 up. As the forward end of lever 47 pushes end part of the front screen hook lever 16 after the mirror 48 is pushed up, the lever 16 is rotated to clockwise direction. By this, the engagement between the lever 16 and the master gear 9 is released, thus the front screen 14 runs by the front screen pull spring 21. Also by the rotation of the lever 16 to clockwise direction the count switch SE and the switch SA is made OFF and the movable contacting piece of the switch SB is changed over to the fixed contact a side to magnetize the electro-magnet $Mg_1$ for retaining the rear screen 19. And after an elapse of such period of time as determined by the resistance value of the shutter time setting variable resistance 56 and the capacitor 131, the trigger circuit 130 is activated to place the electro-magnet $Mg_1$ in a non-magnetized state. By this, the electro-magnet $Mg_1$ releases attraction of the lever 50, thus the rear screen 19 runs by the rear screen pull spring 22. By running of the rear screen 19 the gear 90 rotates to rotate the lever 26 to counterclockwise direction. Since the engagement between the hooked part 26a of the lever 26 and the bent part 25b of the lever 25 is released by said rotation of the lever 26, the lever 25 is rotated to counterclockwise direction by spring 25a. As the lever 45 rotates also integrally at this time, the mirror push up lever 47 is rotated to clockwise direction by spring 49 to have the mirror 48 descend, returning the same to its original position. Also as the automatic stop down lever 46 being engaged with one end 45a of the lever 45 is rotated to counterclockwise direction by the spring 46a, the stop down pin 33g is also returned, thus diaphragm is placed in a fully opened state.

Next, explanation will be made on a case when an automatic diaphragm control system with shutter time preference is changed over to an automatic shutter control system with diaphragm preference using the maximum aperture or the minimum aperture of a lens used as the set diaphragm aperture value, as an object brightness exceeds said maximum aperture or the minimum aperture of a lens used for using said brightness for appropriate diaphragm. In this case, explanation of such parts as making same function as those in a control system with diaphragm preference or with shutter time preference mentioned above will be omitted.

First explanations will be made on a case when an object brightness is too dark. As the release button 41 is pressed, the engagement between the hooked part 31a and the claw part 29b of the saw tooth ring 29 is released and the saw tooth ring 29 rotates to clockwise direction by the spring 30, but as object brightness is too dark the output level of the photographing information setting circuit 102 already becomes higher than the output level of the object brightness information circuit 101. Because of this, the comparison cirucit 129 instantly gives matching signal to the trigger cirucit 130, therefore the electro-magnet $Mg_2$ becomes excited and the saw tooth block lever 62 is made to engage with the first step of saw teeth 29f of the saw tooth ring 29. At this time, the saw tooth ring 29 comes to such position that its notched part 29d faces the pin 66a of the sensor lever 66. Because of this as the mirror push-up lever 47 rotates to counterclockwise direction, the pushing link members 67, 68 rotates the sensor lever 66 to clockwise direction in collaboration with the pressing pressure spring 69. By this, the pin 66a of the sensor lever 66 drops into the notched part 29d of the saw tooth ring 29, therefore the rotation of the sensor lever 66 is accelerated. Thus, the end part of the sensor lever 66 changes over the switches $S_1$ to $S_5$ and the diaphragm aperture value input information for the maximum aperture is set at the variable resistance 32c, and the exposure control circuit is changed over to the automatic shutter control system with diaphragm preference. In this case such shutter time as corresponding to the object brightness information output being memorized and retained is determined irrespective of set time on the shutter dial 38 and appropriate exposure is obtained. The pointer 71a of the meter 71 pointing the limit mark 73a is shown within finder field of vision.

Next explanations will be made on a case when object brightness is too bright. As the shutter button 41 is pressed, the engagement between hooked part 31a and the claw part 29b of the saw tooth ring 29 is released and the saw tooth ring 29 rotates to clockwise direction by the spring 30, but as the object brightness is too bright, even if the saw tooth ring 29 rotates to its last position (until the claw part 32g comes in contact with the diaphragm step number pin 33h), the output level of the photographing information setting circuit 102 will not coincide with the output level of the object brightness information circuit 101. However, as the saw tooth ring 29 rotates to its last position, the saw tooth ring 29 comes to such position that its notched part 29e faces the pin 66a of the sensor lever 66. By this, as the mirror push-up lever 47 rotates to counterclockwise direction, the pressing link members 67, 68 rotates the sensor lever 66 to clockwise direction in collaboration with the pressing pressure spring 69. By this, the pin 66a of the sensor lever 66 drops into the notched part 29d of the saw tooth ring 29, therefore, the rotation of the sensor lever 66 is accelerated. By this, the end part of the sensor lever 66 changes over the switches $S_1$ to $S_5$, and the diaphragm aperture value input information with the minimum aperture is set at the variable resistance 32c, and the exposure control circuit is changed over to the automatic control system with diaphragm, preference.

In this case such shutter time as corresponding to object brightness information output being memorized and retained is determined, thus appropriate exposure is obtained. The pointer 71a of the meter 71 pointing the limit mark 74a is shown within the finder field of vision.

Next, explanations will be made on a case when EE mechanism is set again after it is released. As the diaphragm setting ring 91 is rotated to release the matching of the EE mark with the mark 33a, EE change over pin eee retires, and as the lever 34 rotates in an association with said action, the lever 35 shifts to right direction to rotate the lever 31, and the saw tooth ring 29 is rotated as already mentioned above, but at that time even if the diaphragm setting ring 91 is rotated in a trial to match EE mark 91a with the mark 33a again, the saw tooth ring 29 will not return to its original position, therefore it is necessary to make the matching of EE mark 91a with the mark 33a possible only when the saw tooth ring 29 is returned to its original position. Therefore, as EE change over pin 33e retires the lever 34 rotates to clockwise direction and the forward end part of the lever 34 engages with the notched part 81a of the safety lever 81 and the rotation of the lever 34 is blocked. Now, when the diaghragm setting ring 91 is rotated for having the EE change over pin 33e to protrude, if the lever 82 is rotated to counterclockwise direction the forward end part 82a of the lever 82 pushes the pin 83a of the clamp lever 83, of the lever 82 pushes the pin 83a of the clamp lever 83, therefore the lever 83 rotates to counterclockwise direction to push the safety lever 81 up for releasing the engagement between the notched part 81a of the lever 81 and the lever 34 to make the protruding of the EE change over pin 33e possible. On the other hand, as the pin 82b of the lever 82 pushes the riser part 84a of the lever 84, the lever 84 rotates to counterclockwise direction to shift the lever 27 to right direction. Because of this the lever 27 pushes the pin 29a of the saw tooth ring 29, therefore, the saw tooth ring 29 rotates to counterclockwise direction to have the claw part 29b engaged with the hooked part 31a of the lever 31 and return the saw tooth ring 29 to its original position.

Next, explanations will be made on a case when the depth of field is confirmed.

Since the diaphragm is not stopped down even if the diaphragm setting ring 91 is set at a desired diaphragm value by rotating the same, the depth of the field of the object can not be confirmed even if viewing the object through the eye-piece 60 of finder. Therefore, the lever 82 is rotated to clockwise direction the pin 85a of the slide lever 85 is pressed, thus the lever 85 is shifted to left direction to rotate the automatic stop down lever 46. Because of this, the stop down pin 33g is driven to stop down the diaphragm to the set diaphragm aperture value, thus the depth of field can be confirmed.

Next, explanations will be made on a case when exposure conrol is made manually.

When a manual use button which is not shown in the drawing is operated. The switches $S_6$ SG become ON and at the same time, the switch SH becomes OFF. And as the diaphragm setting ring 91 is rotated to set desired diaphragm aperture value, the diaphragm signal lever 33c is shifted to the desired diaphragm aperture value as mentioned above and at the same time, the switch SF is made OFF to change over the movable contacting piece of the switches $S_1$ and $S_5$ to the fixed contact a side, placing the switches $S_2$ and $S_3$ in ON state and the switch $S_4$ in OFF state. At this time, the switch $S_6$ is retained in ON state by pressing the manual use button. And as the shutter dial 38 is rotated to set it to the desired shutter time, the resistance value of the variable resistance 56 is set at such value as corresponding to the desired shutter time and the switch SD is made OFF. As the release button 41 is pressed in this state, the automatic stop down lever 46 is rotated as mentioned above, therefore the diaphragm is stopped down to the diaphragm aperture value set by the diaphragm setting ring 91. And as the mirror push-up lever 47 is rotated to push-up the mirror 48, the count switch SE and the switch SA is made OFF and at the same time, the movable contacting piece of the switch SB is changed over to the fixed contact a side, magnetizing the electro-magnet $Mg_1$ to retain the rear screen 19.

After an elapse of such period of time as determined by the resistance value of the shutter time setting variable resistance 56 and the capacitor 131, the electro-magnet Mg$_1$ is placed in non-magnetized state to run the rear screen 19. Thereafter the mirror 48 and the automatic diaphragm lever 46 return as mentioned above. At this time, the indication circuit 115 will not function as the switches SF and SD are both in OFF state.

As has been explained in detail, according to the present invention any desired exposure control system can be selected out of the automatic shutter control system with diaphragm preference, an automatic diaphragm control system with shutter time preference and the manual set exposure control system in which each exposure element is manually set, thus satisfactory photograph can be made for all kinds of objects. Also since there is a safety mechanism which will not allow co-existence of change over to the automatic shutter control system and the change over to the automatic diaphragm conrol system, there will be no fear for erroneous operation. Furthermore, when the object brightness is darker than the combination of the set shutter time and the maximum diaphragm aperture of the lens used as the automatic shutter control system is used, the exposure control pattern is automatically changed over to the automatic shutter control system with diaphragm preference using the above mentioned maximum diaphragm aperture of the lens used as the set value. Also when the object brightness is brighter than the combination of the set shutter time and the minimum diaphragm aperture of the lens used, the exposure control pattern is automatically changed over to the automatic shutter time control system with diaphragm preference using the minimum diaphragm aperture of the lens used as the set value.

Further, since the exposure control circuit constitutes a comparative symmetrical type, the change over of each exposure conrol system is easy, yet it is hardly influenced by temperature change and voltage change.

Also as a temperature compensation circuit is inserted between the timer circuit and the comparison circuit in the diaphragm preference, exposure error in the circuit elements, particularly in diodes by their temperature reliance will not take place as in the shutter preference.

What is claimed is:

1. A camera shutter timing network comprising:
    a. a light sensitive element for producing a first electrical signal which represents the intensity of light incident thereon;
    b. a logarithm conversion means for converting the first electrical signal from said light sensitive element into a second electrical signal having a value proportional to a logarithm of the value of the light intensity;
    c. a memory capacitor for storing the second electrical signal;
    d. logarithmic compression means for producing a third electrical signal having a value proportional to a logarithm of a selected diaphragm opening value;
    e. an integration circuit having a timing capacitor and a semi-conductive active element connected in series with the timing capacitor, wherein said semi-conductive active element expands the third electrical signal;
    f. means for charging the timing capacitor at a current rate corresponding to the third electrical signal;
    g. temperature compensating means connected to said integration circuit for compensating the output variation of the semi-conductive active element responsive to temperature variation, said temperature compensating means including:
        an impedance conversion circuit having an input terminal connected to the output terminal of said timing capacitor of said integration circuit;
        an electrical power source which has its output power varied according to temperature variation,
        a first operational amplifier having positive and negative input terminals and an output terminal in which said power source is connected to the positive input terminal and the output terminal of said impedance conversion circuit is connected to the negative input terminal,
        a second operational amplifier having a negative input terminal connected to the output terminal of said first operational amplifier,
        an impedance means to produce such resistance value as corresponds to temperature variation, wherein said impedance means is connected between the output terminal of said first operational amplifier and the negative terminal of said second operational amplifier, and
        a second power source for producing a constant D.C. voltage, wherein said second power source is connected to the positive terminal of said second operational amplifier;
    h. a control means connected between said memory capacitor and the output terminal of said second operational; amplifier of the temperature compensation means to compare the output voltage from said memory capacitor and the output voltage of said timing capacitor of the integration circuit for controlling said camera shutter according to such period of time so that the output voltage of said timing capacitor corresponds to the output voltage from said memory capacitor 2. A network according to claim 1, wherein said impedance means is a thermistor.

3. A network according to claim 1, wherein the impedance means is a resistance having a positive temperature coefficient.

4. A network according to claim 1, wherein said impedance means is a coil resistance.

5. A network according to claim 1, wherein said temperature compensating means is connected with the output terminal of said integration circuit.

6. A network according to claim 1, wherein said semi-conductive active element is a diode.

7. In a camera having an electrically controlled shutter, an exposure control arrangement comprising:
    a. light sensitive means for producing a first electrical signal which represents the intensity of light incident thereon;
    b. logarithmic compression means for producing a second electrical signal having a value corresponding to a logarithm of a selected exposure parameter;
    c. an integration circuit having a timing capacitor and a semi-conductive active element connected in series with the timing capacitor, wherein said semi-conductive active element expands the second electrical signal;

d. means for charging the timing capacitor at a predetermined rate corresponding to the second electrical signal;
e. temperature compensating means connected to said integration circuit for compensating the output variation of the semi-conductive active element responsive to temperature variation, said temperature compensating means including bias voltage means which has its output varied according to temperature variation, a first operational amplifier in which said bias voltage means is connected to one input terminal and the output terminal of said integration circuit is connected to the other input terminal, a second operational amplifier having one input terminal connected to the output terminal of said first operational amplifier, impedance means to produce such resistance value as corresponding to temperature variation, wherein said impedance means is connected between the output terminal of said first operational amplifier and the one terminal of said second operational amplifier, and a second power source for producing a constant voltage, wherein said second power source is connected to the other terminal of said second operational amplifier; and
f. an electric circuit connected to the output terminal of said second operational amplifier for comparing the first electrical signal and the output voltage of said timing capacitor and, when the first electrical signal and the output voltage have achieved a predetermined relationship, for operating an electromagnet to start the shutter closing operation.

8. In a camera having an electrically controlled shutter, an exposure control arrangement comprising:
a. light sensitive means for producing a first electrical signal which represents the intensity of light incident thereon;
b. release means for starting the shutter opening operation;
c. storage means responsive to the initiation of the release means for storing a second electrical signal having a value corresponding to the first electrical signal;
d. logarthmic compression means for producing a third electrical signal having a value corresponding to a logarithm of a selected exposure parameter;
e. an integration circuit having a timing capacitor and a semi-conductive active element connected in series with the timing capacitor, wherein said semi-conductive active element expands the third electrical signal;
f. means for charging the timing capacitor at a predetermined rate corresponding to the third electrical signal;
g. temperature compensating means connected to said integration circuit for compensating the output variation of the semi-conductive active element responsive to temperature variation, said temperature compensating means including bias voltage means which has its output varied according to temperature variation, a first operational amplifier in which said bias voltage means is connected to one input terminal and the output terminal of said integration circuit is connected to the other input terminal, a second operational amplifier having one input terminal connected to the output terminal of said first operational amplifier, impedance means to produce such resistance value as corresponds to temperature variation, wherein said impedance means is connected between the output terminal of said first operational amplifier and the one terminal of said second operational amplifier, and a second power source for producing a constant voltage, wherein said second power source is connected to the other terminal of said second operational amplifier; and
h. an electric circuit connected to the output terminal of said second operational amplifier for comparing the second electrical signal and the output voltage of said timing capacitor and, when the second electrical signal and the output voltage have achieved a predetermined relationship, for operating an electromagnet to start the shutter closing operation.

9. In a camera having an electrically controlled shutter, an exposure control arrangement comprising:
a. photoelectric means for producing a first electrical signal corresponding to the intensity of light incident thereon;
b. information means for producing a second electrical signal corresponding to a logarithm of a selected aperture opening value;
c. timing circuit connected to said information means, said timing circuit including expansion means which has the output varied according to temperature variation, for expanding the second electrical signal from said information means;
d. temperature compensating means connected to said timing circuit for compensating the output variation of said expansion means, said temperature compensating means including bias voltage means which has the output varied according to temperature variation, a first operational amplifier in which said bias voltage means is connected to one input terminal and the output terminal of said timing circuit is connected to the other input terminal, a second operation amplifier having one input terminal connected to the output terminal of said first operational amplifier, impedance means to produce such resistance value as corresponds to temperature variation, wherein said impedance means is connected between the output terminal of said first operational amplifier and the one terminal of said second operational amplifier, and a constant voltage circuit, said constant voltage circuit being connected to the other terminal of said second operational amplifier;
e. means cooperating with a shutter start mechanism to start the timing operation of said timing circuit; and
f. an electric circuit connected to the output terminal of said second operational amplifier for comparing the first electrical signal operational amplifier for comparing the first electrical signal and the output of said timing circuit and, when the first electrical signal and the output of said timing circuit have achieved a predetermined relationship, for operating a means to start the shutter closing operation.

10. In a camera having an electrically controlled shutter, an exposure control arrangement comprising:
a. photoelectric means for producing a first electrical signal corresponding to the intensity of light incident thereon;
b. information means for producing a second electrical signal corresponding to a logarithm of a selected aperture opening value;

c. timing circuit connected to said information means, said timing circuit including expansion means which has the output varied according to temperature variation, for expanding the second electrical signal from said information means;
d. temperature compensating means connected to said timing circuit for compensating the output variation of said expansion means, said temperature compensating means including bias voltage means which has the output varied according to temperature variation, a first operational amplifier having positive input terminal connected to said bias voltage means and the negative input terminal connected to the output terminal of said timing circuit, a second operational amplifier having a negative input terminal connected to the output terminal of said first operational amplifier, impedance means to produce such resistance value as corresponding to temperature variation, said impedance means being connected between the output terminal of said first operational amplifier and the negative terminal of said second operational amplifier, and a constant voltage circuit being connected to the positive input terminal of said second operational amplifier;
e. means cooperating with a shutter start mechanism to start the timing operation of said timing circuit; and
f. an electric circuit connected to the output terminal of said second operational amplifier for comparing the first electrical signal and the output of said timing circuit and, when the first electrical signal and the output of said timing circuit have come into a predetermined relationship, for operating a means to start the shutter closing operation.

11. In a camera having an electrically controlled shutter, an exposure control arrangement comprising:
a. first setting means for producing a first electrical signal corresponding to a logarithm of a selected aperture opening value;
b. second setting means for producing a second electrical signal corresponding to a selected shutter speed value;
c. timing circuit having expansion means which has has the output varied according to temperature variation, for expanding the first electrical signal from first setting means;
d. temperature compensating means connected to the output terminal of said timing circuit for compensating the output variation of said expansion means responsive to temperature variation;
e. means cooperating with a shutter start mechanism and starting the timing operation of said timing circuit;
f. control means for operating a means to start the shutter closing operation when the output of said timing circuit reaches a predetermined value; and
g. means for connecting the input terminal of said control means to the output terminal of said temperature compensating means when said first setting means is connected to said timing circuit, and for connecting the input terminal of said control means to the output terminal of said timing circuit when said second setting means is connected to said timing circuit.

* * * * *